US009293016B2

(12) United States Patent
Friedman

(10) Patent No.: US 9,293,016 B2
(45) Date of Patent: Mar. 22, 2016

(54) METHOD AND APPARATUS FOR PROCESSING SENSOR DATA OF DETECTED OBJECTS

(75) Inventor: Lee Friedman, Alpharetta, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 469 days.

(21) Appl. No.: 13/454,729

(22) Filed: Apr. 24, 2012

(65) Prior Publication Data

US 2013/0278422 A1 Oct. 24, 2013

(51) Int. Cl.
*G08B 13/00* (2006.01)
*G08B 13/196* (2006.01)
*G08B 25/10* (2006.01)
*G08B 21/22* (2006.01)

(52) U.S. Cl.
CPC ............. *G08B 13/196* (2013.01); *G08B 25/10* (2013.01); *G08B 13/00* (2013.01); *G08B 13/19613* (2013.01); *G08B 13/19645* (2013.01); *G08B 21/22* (2013.01)

(58) Field of Classification Search
CPC ......................... G06K 9/00201; G08B 25/009
USPC ................................................... 340/541, 5.2
See application file for complete search history.

(56) References Cited

U.S. PATENT DOCUMENTS

| 6,882,741 | B2 | 4/2005 | Dobashi et al. |
| 6,941,575 | B2 | 9/2005 | Allen |
| 7,257,236 | B2* | 8/2007 | Yukhin ............... G06K 9/00201 348/135 |
| 7,688,349 | B2 | 3/2010 | Flickner et al. |
| 7,956,890 | B2* | 6/2011 | Cheng ................ G06K 9/00771 348/143 |
| 8,144,197 | B2* | 3/2012 | Broad .................. G08B 25/009 340/506 |
| 8,316,237 | B1* | 11/2012 | Felsher ................ H04L 9/0825 380/282 |
| 8,345,918 | B2* | 1/2013 | Fleisher ............. G01N 21/3581 342/22 |
| 8,369,967 | B2* | 2/2013 | Hoffberg ............... G05B 15/02 340/507 |
| 8,370,030 | B1* | 2/2013 | Gurin ........................ B60R 1/00 180/272 |
| 2003/0231788 | A1* | 12/2003 | Yukhin .............. G06K 9/00201 382/115 |
| 2004/0093349 | A1* | 5/2004 | Buinevicius ........... G06Q 10/00 |
| 2004/0128065 | A1 | 7/2004 | Taylor et al. |
| 2005/0261815 | A1 | 11/2005 | Cowelchuk et al. |

(Continued)

OTHER PUBLICATIONS

"Calibrate the Kinect sensor", http://support.xbox.com/en-US/kinect/body-tracking/start-calibration, Mar. 2, 2012, 3 pages.

(Continued)

*Primary Examiner* — Jennifer Mehmood
*Assistant Examiner* — Rufus Point
(74) *Attorney, Agent, or Firm* — Guntin & Gust, PLC; Jay H. Anderson

(57) ABSTRACT

A system that incorporates teachings of the subject disclosure may include, for example, a method for detecting, by a system including at least one processor, a presence of an object from sensor data generated by a sensor device, retrieving, by the system, from a memory device a plurality of profiles biometrically descriptive of approved objects, asserting, by the system, an alarm responsive to determining from the sensor data that the detected object is not biometrically correlated to any of the plurality of profiles, classifying, by the system, the detected object as an authorized object responsive to determining from the sensor data that the detected object is biometrically correlated to at least one of the plurality of profiles, and notifying, by the system, at least one neighboring device responsive to asserting the alarm or responsive to classifying the detected object as the authorized object. Other embodiments are disclosed.

20 Claims, 10 Drawing Sheets

(56) References Cited

U.S. PATENT DOCUMENTS

| | | | |
|---|---|---|---|
| 2006/0001650 A1 | 1/2006 | Robbins | |
| 2006/0040679 A1* | 2/2006 | Shikano | G06Q 30/00 455/457 |
| 2006/0093190 A1* | 5/2006 | Cheng | G06K 9/00771 382/115 |
| 2006/0220843 A1* | 10/2006 | Broad | G08B 25/009 340/539.23 |
| 2007/0090944 A1 | 4/2007 | Du Breuil | |
| 2007/0133844 A1* | 6/2007 | Waehner | G06K 9/2036 382/118 |
| 2008/0215679 A1 | 9/2008 | Gillo et al. | |
| 2008/0309486 A1* | 12/2008 | McKenna | G08B 1/08 340/540 |
| 2009/0022362 A1* | 1/2009 | Gagvani | G06T 7/2053 382/100 |
| 2009/0287837 A1* | 11/2009 | Felsher | G06F 19/322 709/229 |
| 2009/0315733 A1* | 12/2009 | Bischoff | G06Q 50/22 340/659 |
| 2010/0156820 A1 | 6/2010 | Lin et al. | |
| 2010/0289825 A1 | 11/2010 | Shin et al. | |
| 2011/0074710 A1 | 3/2011 | Weeldreyer et al. | |
| 2011/0090085 A1* | 4/2011 | Belz | G08B 21/0423 340/573.1 |
| 2011/0093876 A1* | 4/2011 | Belz | G08B 21/0423 725/12 |
| 2011/0141009 A1 | 6/2011 | Izumi | |
| 2012/0229377 A1 | 9/2012 | Kim et al. | |

OTHER PUBLICATIONS

"Revoluationary Approach to creating rich, robust in-game characters and worlds for motion control games", Activate3D, Mar. 8, 2012, 1 page.

"YouTube—Broadcast Yourself", [www.youtube.com/embed/nyTorexlC3w], Mar. 8, 2012, 1 page.

Chacksfield, Marc, "In pictures: Samsung and LG's gesture TV tech", www.techradar.com, Mar. 2, 2012, 6 pages.

"Hover to Select Images", http://www.youtube.com/embed/nyTorex1C3w, Mar. 8, 2012, 1 page.

"Revolutionary Approach to creating rich, robust in-game characters and worlds for motion control games", http://activate3d.com, Mar. 8, 2012, 1 page.

* cited by examiner

100

800

METHOD AND APPARATUS FOR PROCESSING SENSOR DATA OF DETECTED OBJECTS

FIELD OF THE DISCLOSURE

The subject disclosure relates generally to a method and apparatus for processing sensor data of detected objects.

BACKGROUND

Current monitoring systems use a combination of passive infrared detectors and optical cameras to monitor areas. Infrared sensors detect heat signatures, which can be used among other things to trigger an alarm when an object emanating heat is detected. Cameras can also be used to trigger an alarm if enough pixels change to identify a foreign object.

Lighting changes, however, can cause false detections by a camera and consequently false alarms. Hot ambient temperatures can cause an infrared detector to not detect an animal or person in its field of detection.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for monitoring objects, performing detections thereof, identifying the objects as foreign or authorized objects, tracking the foreign or authorized objects, and triggering alarms or enabling services depending on whether the object is a foreign object or authorized object, respectively. Other embodiments are contemplated by the subject disclosure.

One embodiment of the subject disclosure includes a sensor, a memory storing computer instructions, and a processor coupled to the memory. Responsive to executing the computer instructions, the processor can perform operations including receiving sensor data from the sensor, detecting an object according to the sensor data, asserting an alarm responsive to determining from the sensor data that the detected object is not correlated to any of a plurality of profiles biometrically descriptive of approved objects, classifying the detected object as an authorized object responsive to determining from the sensor data that the detected object is correlated to at least one of the plurality of profiles, and notifying at least one neighboring device responsive to asserting the alarm or responsive to classifying the detected object as the authorized object.

One embodiment of the subject disclosure includes a method for detecting, by a system including at least one processor, a presence of an object from sensor data generated by a sensor device, retrieving, by the system, from a memory device a plurality of profiles biometrically descriptive of approved objects, asserting, by the system, an alarm responsive to determining from the sensor data that the detected object is not biometrically correlated to any of the plurality of profiles, classifying, by the system, the detected object as an authorized object responsive to determining from the sensor data that the detected object is biometrically correlated to at least one of the plurality of profiles, and notifying, by the system, at least one neighboring device responsive to asserting the alarm or responsive to classifying the detected object as the authorized object.

One embodiment of the subject disclosure includes a computer-readable storage medium having computer instructions, where responsive to at least one processor executing the computer instructions, the at least one processor performs operations including detecting an object from sensor data generated by a sensor device, retrieving a plurality of profiles biometrically descriptive of approved objects, classifying the detected object as an authorized object responsive to determining from the sensor data that the detected object is biometrically correlated to at least one of the plurality of profiles, and notifying at least one neighboring device responsive to classifying the detected object as the authorized object.

Figure 1:
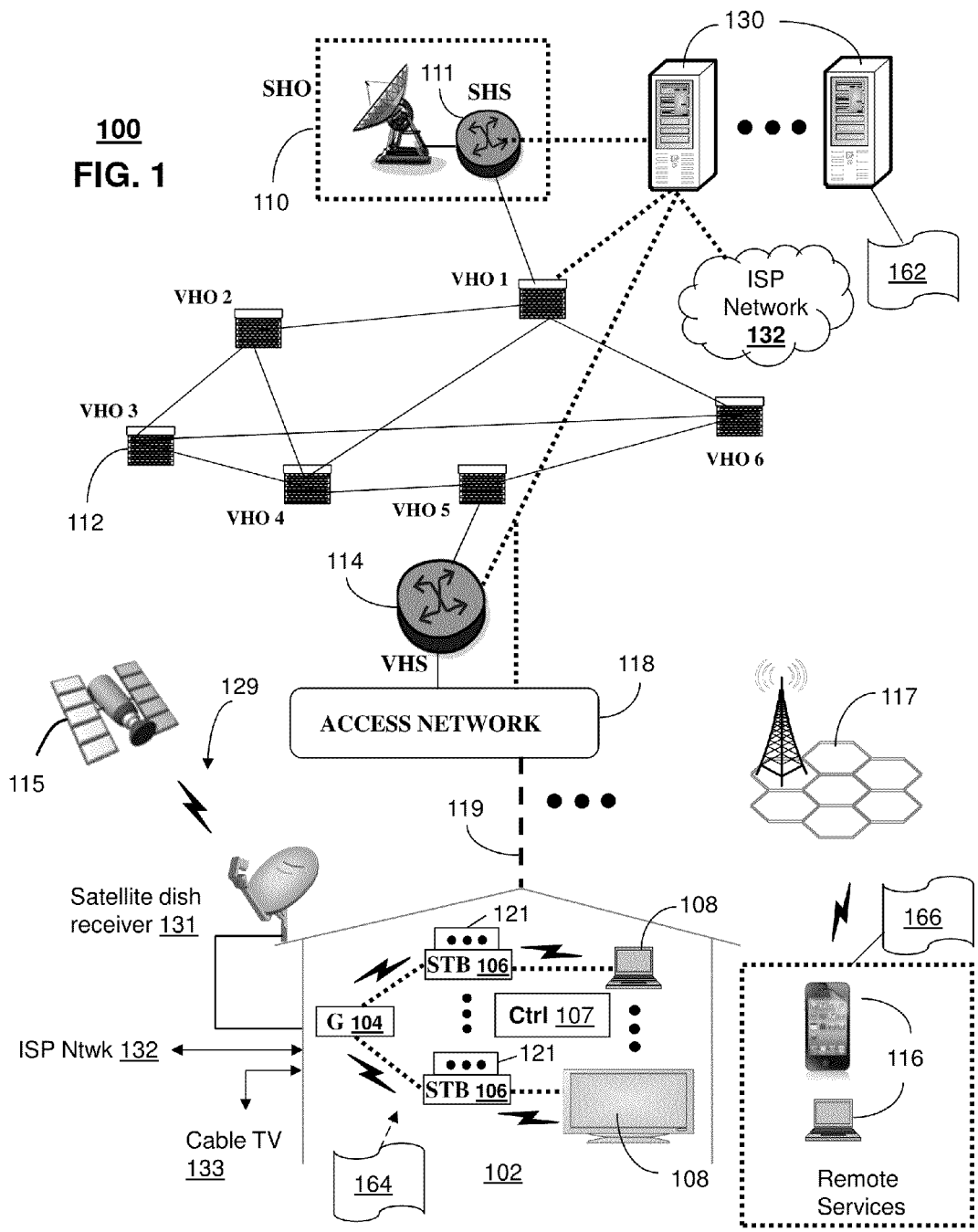
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over the ISP network 132 to wireline media devices 108 or wireless communication devices 116.

Each media processor 106 of FIG. 1 can be further equipped with a sensor 121 that enables the media processors 106 to detect a user's image, depth of body parts of the user, body motions, or other biometric features of the user, which can be used to generate a virtual touchscreen enabling the user to control media presented by the media processor 106 according to software function 164. The wireless communication devices 116 can also include a sensor similar in functionality to sensor 121 and configured with software function 162 to perform virtual touchscreen processing as described for the media processor 106. The present disclosure can utilize or combine some or all embodiments described in U.S. patent application Ser. No. 13/441,072, filed on Apr. 6, 2012, entitled, "Method and Apparatus for Presenting a Virtual Touchscreen," which is hereby incorporated by reference into the present disclosure in its entirety.

Figure 7:
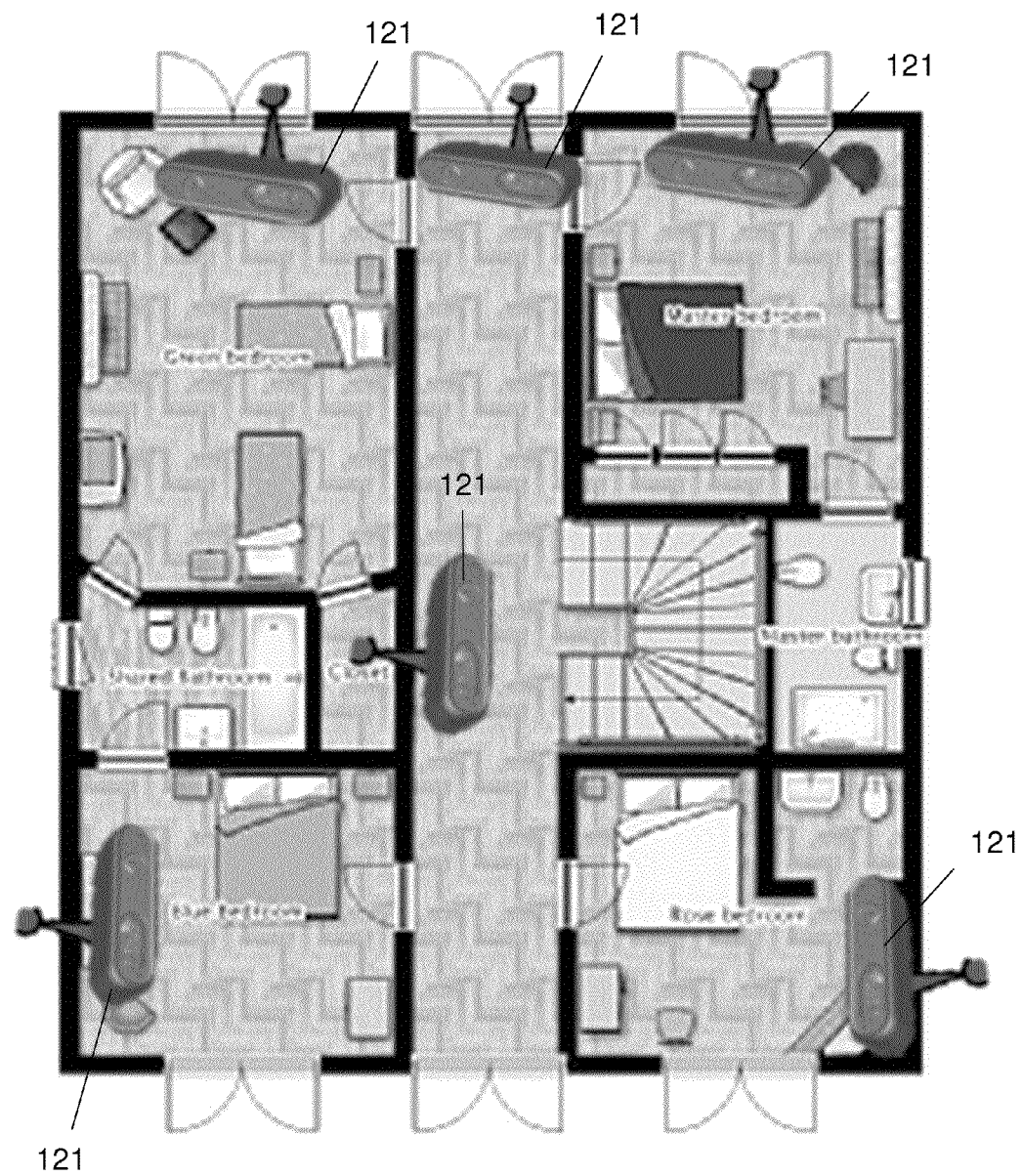
FIGS. 7-8 depict illustrative embodiments for placement of the device of FIGS. 5-6.
Figure 8:
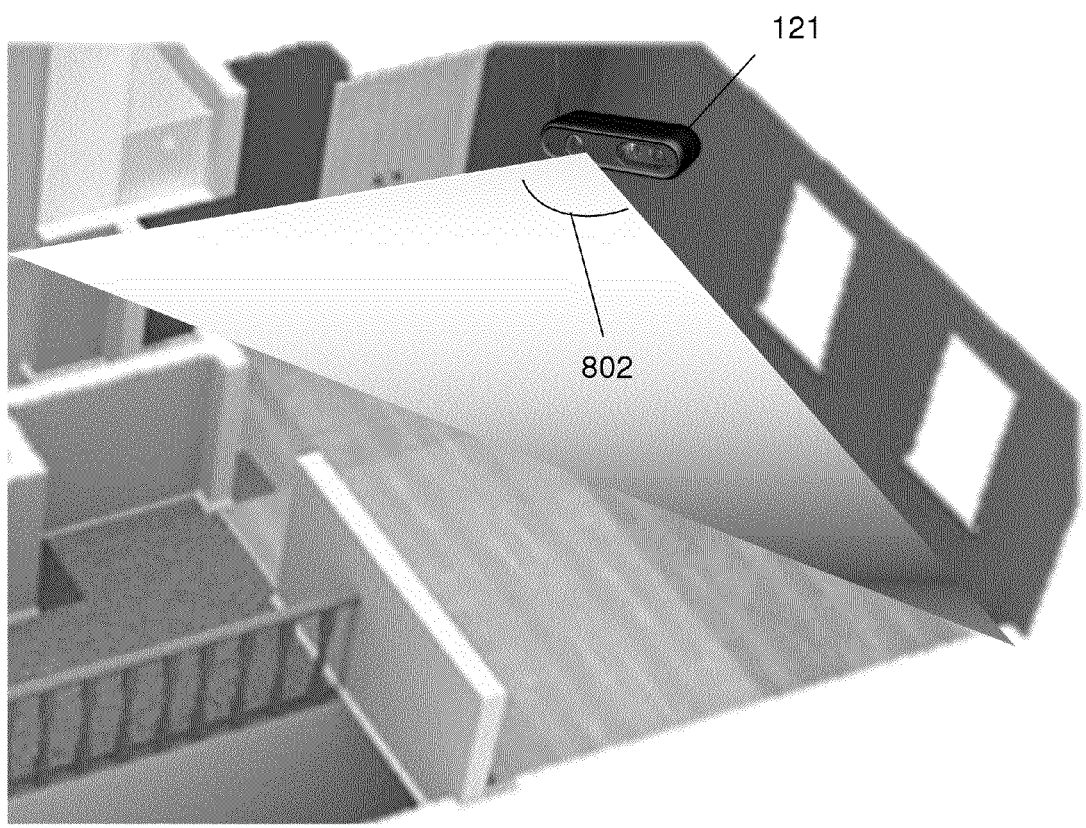

Sensor 121 can also operate as an independently operated device, which can be placed in multiple areas of building 102 (e.g., rooms, open areas, areas outside of building 102, etc.) as shown in FIGS. 7-8. Each sensor 121 can be configure for monitoring objects, performing detections thereof, identifying the objects as foreign or authorized objects, tracking the foreign or authorized objects, and triggering alarms or enabling services depending on whether the object is a foreign object or authorized object, respectively.

Communication system 100 can also provide for all or a portion of the computing devices 130 to function as a server (herein referred to as server 130). The server 130 can use computing and communication technology to perform function 162, which can include among things, processing of biometric information captured by sensors 121, monitoring areas of building 102, and/or enabling or configuring control of media presentations provided by the media processor 106.

The media processors 106 and wireless communication devices 116 can be provisioned with software functions 162 and 164, respectively, to utilize the services of server 130.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wireless access network technologies are contemplated by the subject disclosure.

Figure 2:
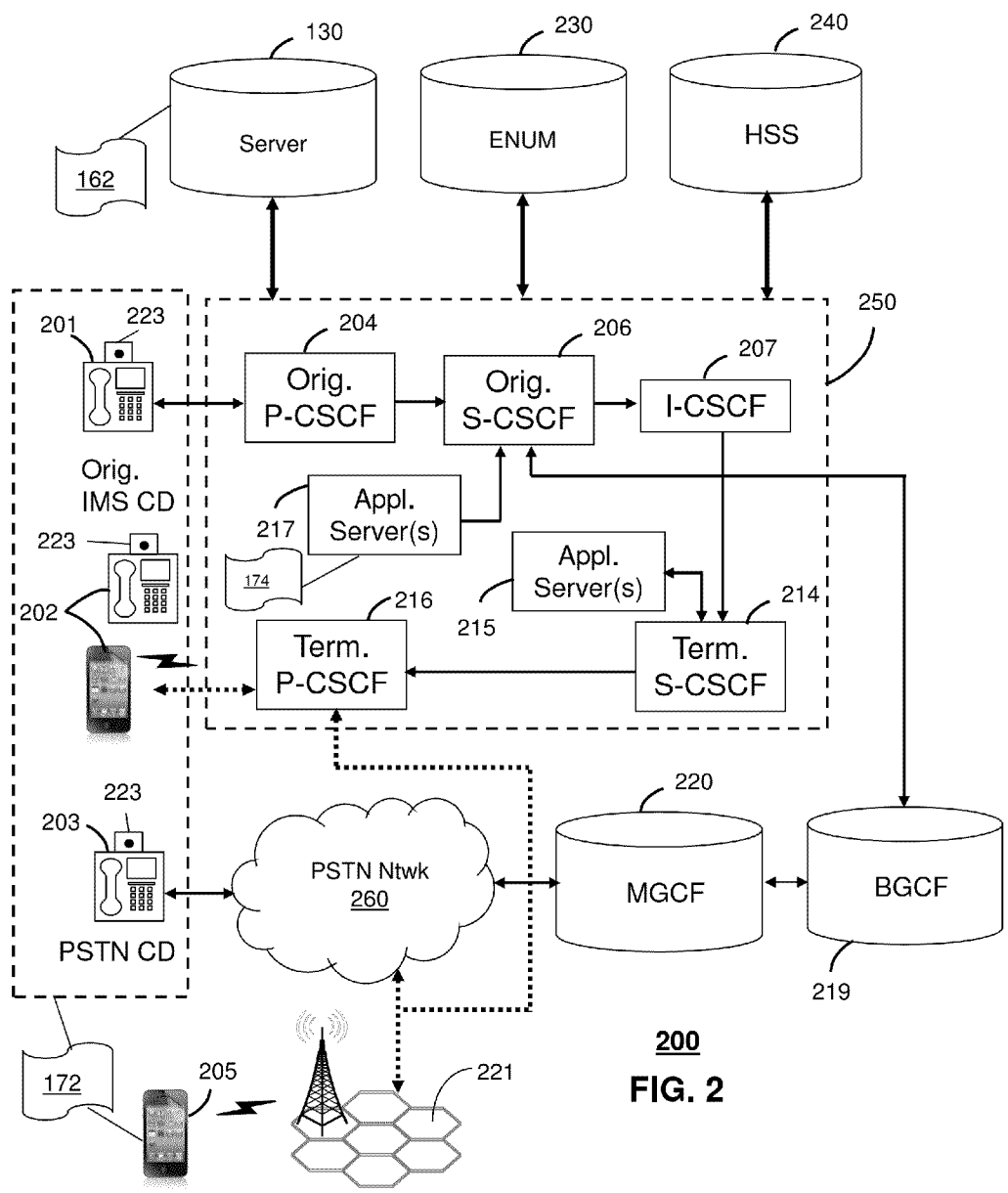

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a Digital Enhanced Cordless Telecommunications (DECT) base unit, or another suitable wireless access unit to establish communications with the IMS network 250 of FIG. 2. The cellular access base station 221 can operate according to common wireless access protocols such as GSM, CDMA, TDMA, UMTS, WiMax, SDR, LTE, and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 130 of FIG. 1 can be operably coupled to the second communication system 200 for purposes similar to those described above. It is further contemplated by the subject disclosure that server 130 can perform function 162 and thereby provide services to the CDs 201, 202, 203 and 205 of FIG. 2. CDs 201, 202, 203 and 205, which can be adapted with software to perform function 172 to utilize the services of the server 130. It is further contemplated that the server 130 can be an integral part of the application server(s) 217 performing function 174, which can be substantially similar to function 162 and adapted to the operations of the IMS network 250. It is also contemplated that CDs 201, 202, 203 and 205 can be equipped with a sensor 223 having similar functionality to the sensor 121 described in FIG. 1.

Figure 3:
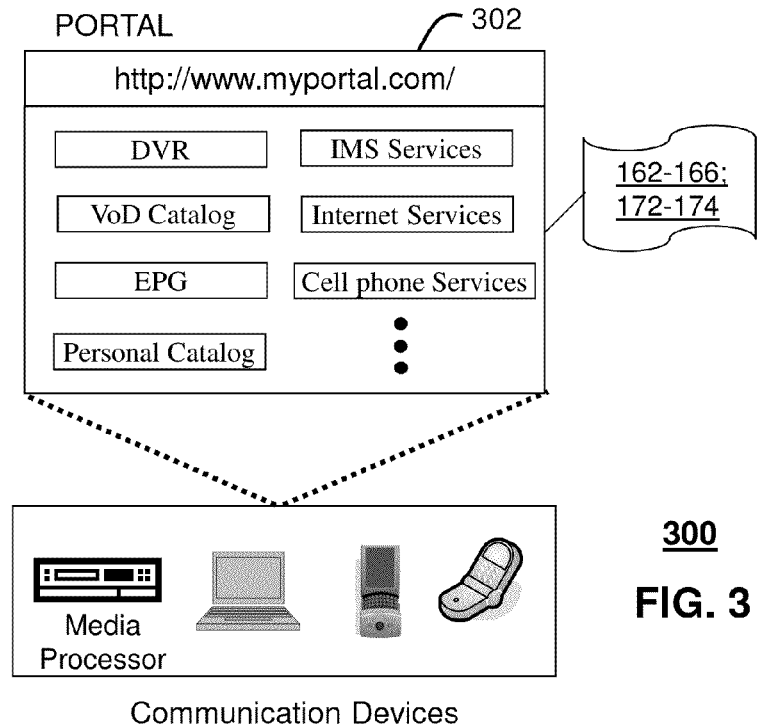
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-164, and 172-174 to adapt these applications as may be desired by subscribers and service providers of communication systems 100-200.

Figure 4:
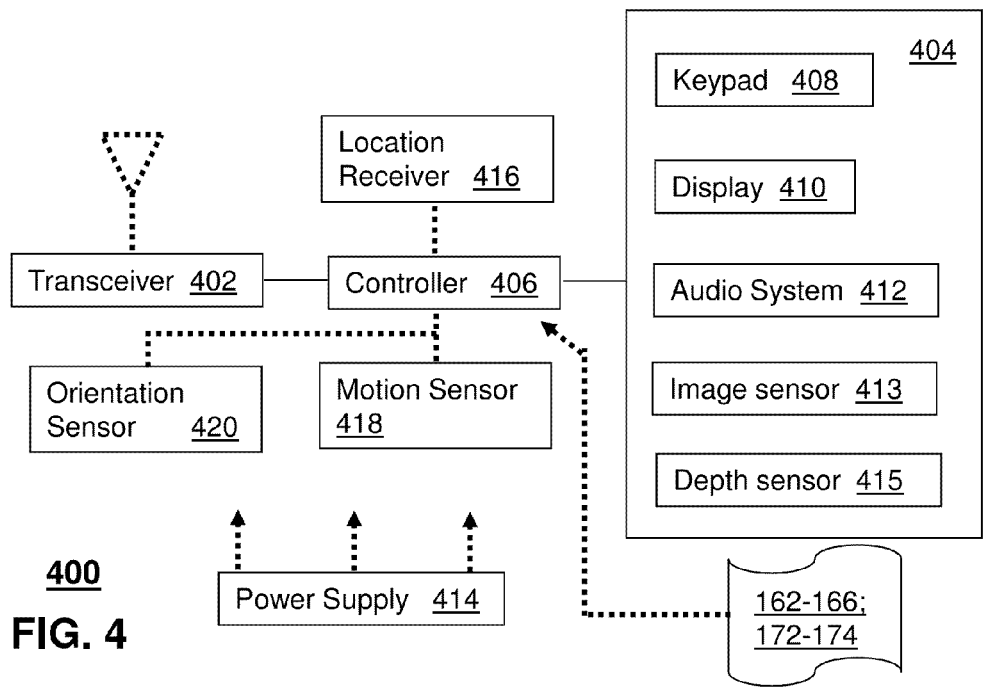
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images. The UI 404 can further include a depth sensor 415 comprising, for example, and infrared emitter and infrared sensor to detect depth of objects such as a user's arm when stretched out.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure. The communication device 400 can also be adapted to perform the functions of the media processor 106, the media devices 108, the portable communication devices 116, the sensor 121 of FIG. 1, as well as the IMS CDs 201-202 and PSTN CDs 203-205 of FIG. 2. It will be appreciated that the communication device 400 can also represent other devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-176, respectively.

Figure 5:
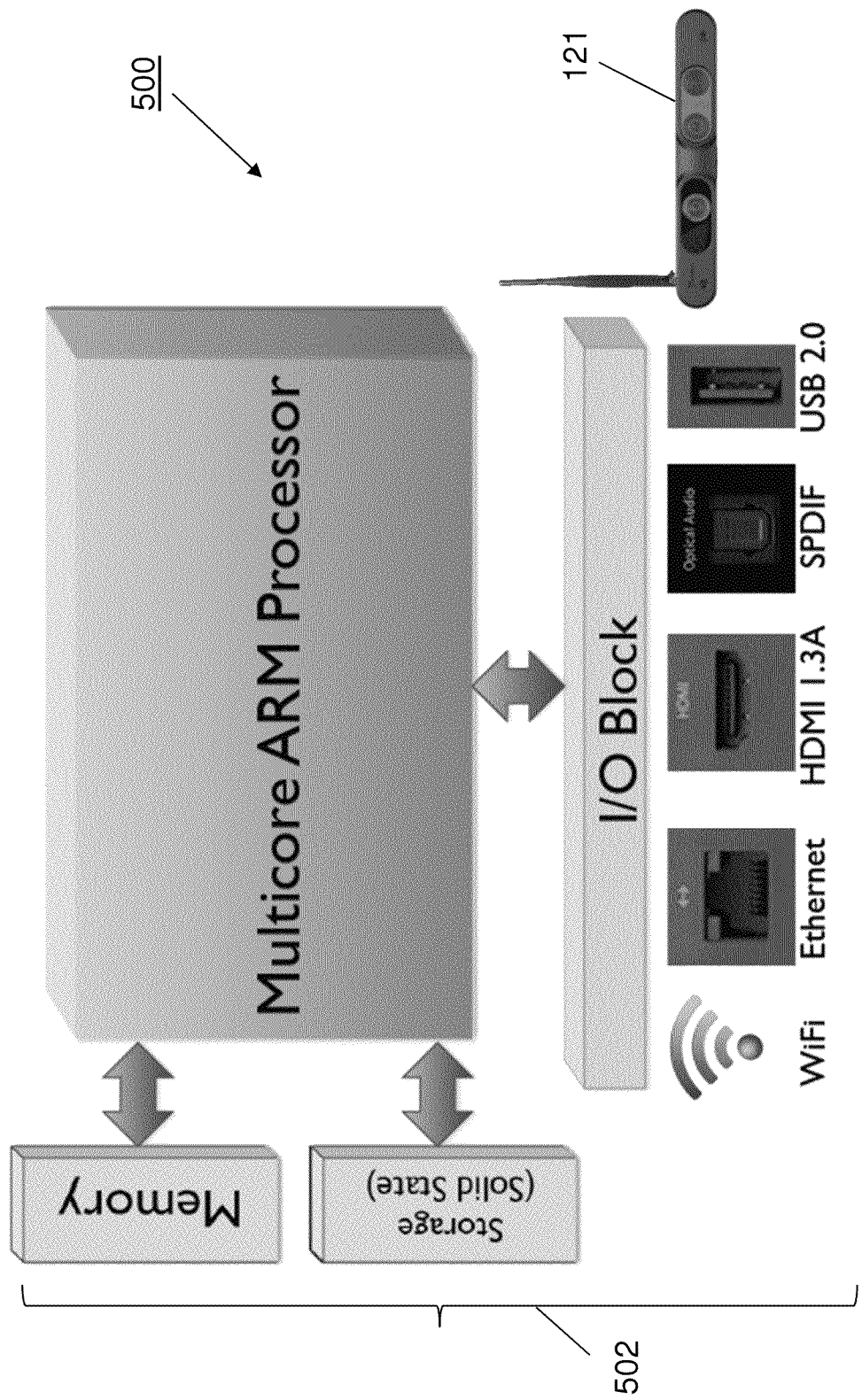
FIGS. 5-6 depict illustrative embodiments of a device for processing detected objects.
Figure 6:
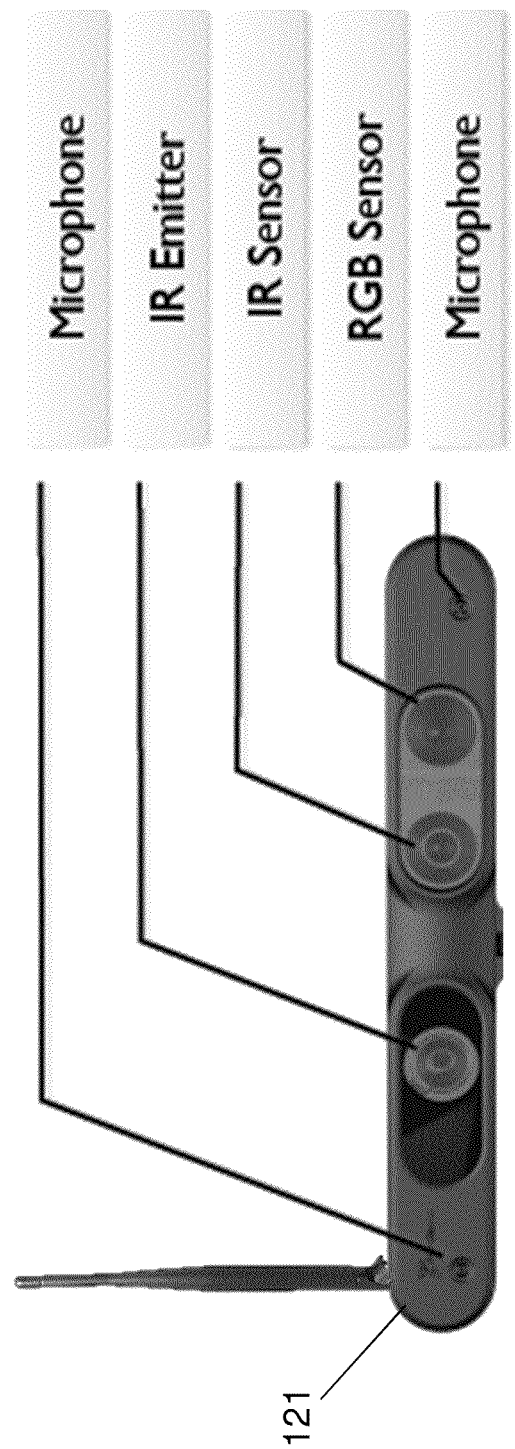

FIGS. 5-6 depict illustrative embodiments of a system 500. The system 500 illustrated in FIG. 5 can include computing resources 502 including, for example, a multicore ARM processor and memory devices for storing media content and computer instructions which are executed by the ARM processor. The ARM processor can be coupled to input/output blocks supporting various I/O port technologies such as a WiFi port, an Ethernet port, a high-definition multimedia interface (HDMI) port, a Sony/Philips Digital InterFace (SPDIF) port, or a USB 2.0 port for exchanging messages with other sensors 121 or the server 131, for exchanging media signals, for controlling appliance resources of a building (e.g., lighting, audio services, etc.), and/or for controlling a presentation device such as a high-definition television, a portable media player, a computer monitor, and other suitable presentation devices. The computing resources 502 of system 500 can be included in an image and infrared sensor camera which collectively performs the functions of the sensor 121. The image and infrared sensor camera of FIGS. 5-6 is herein referred to as sensor 121. Sensor 121 can include a microphone for receiving audible signals, an infrared (IR) emitter, an IR sensor, and an image (red, green, blue or RGB) sensor. Sensor 121 can process detectable signals of an object to create a biometric signature of the object, which can be stored in profiles for identifying foreign and authorized objects.

Figure 9:
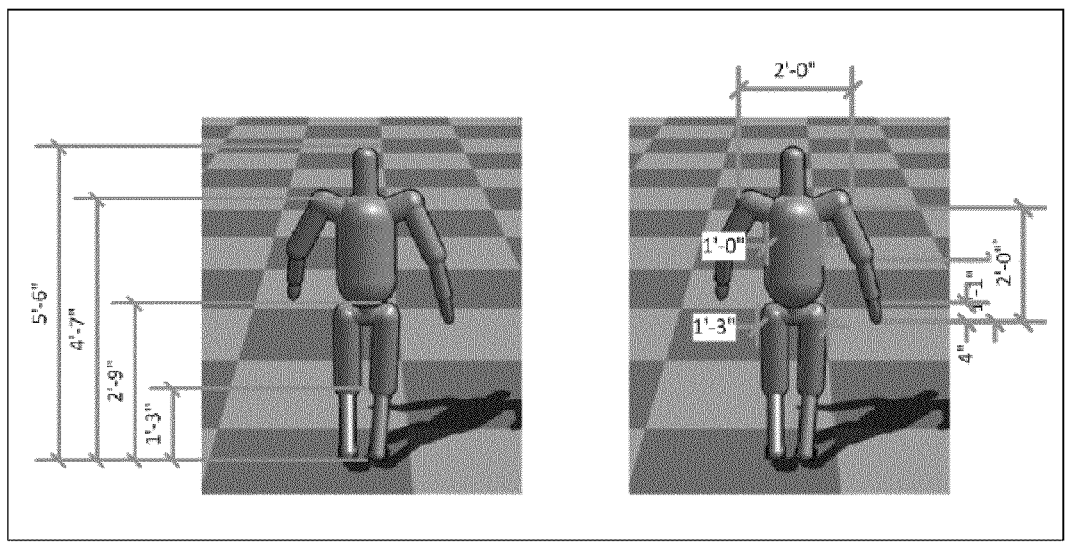
FIG. 9 depicts an illustrative embodiment for analyzing member parts of an object.

A human object (person) can be sensed, for example, by the sensor 121, thereby generating sensor data in the form of image and infrared data which can be analyzed to assess dimensions and contours of member parts of the person as shown in FIG. 9. From the analysis, the sensor 121 can generate a biometric signature of the person for enabling future identification thereof. Although the person shown in FIG. 9 is depicted in a single perspective, other perspectives can be requested by the sensor 121 of the person (e.g., side views, rear view, etc.) in order to perform a more comprehensive biometric analysis of the person. The requests submitted by the sensor 121 can be audible and/or can be presented by way of a television monitor.

The biometric signature of the person that is generated by the sensor 121 can include among other things metrics on height, arm length, leg length, shoulder width, hip width, body contours, facial characteristics, color of skin, color of eyes, and so on. The sensor 121 can also collect voice data, which can be included in the biometric signature. Gestures made by the person can be recorded to identify gesture signals (e.g., hand gestures) for purposes of identifying the person and/or commands generated by the person to control objects in the premises. The sensor 121 can also detect that the object being analyzed is a biped, and thereby store the biometric signature of the person in a humanoid profile Animals such as pets (cats, dogs, hamsters, etc.) can also be analyzed by the sensor 121 to generate biometric signatures of animal objects. Once the sensor 121 identifies the animal as a quadruped, it can store the biometric signature in an animal profile.

Figure 10:
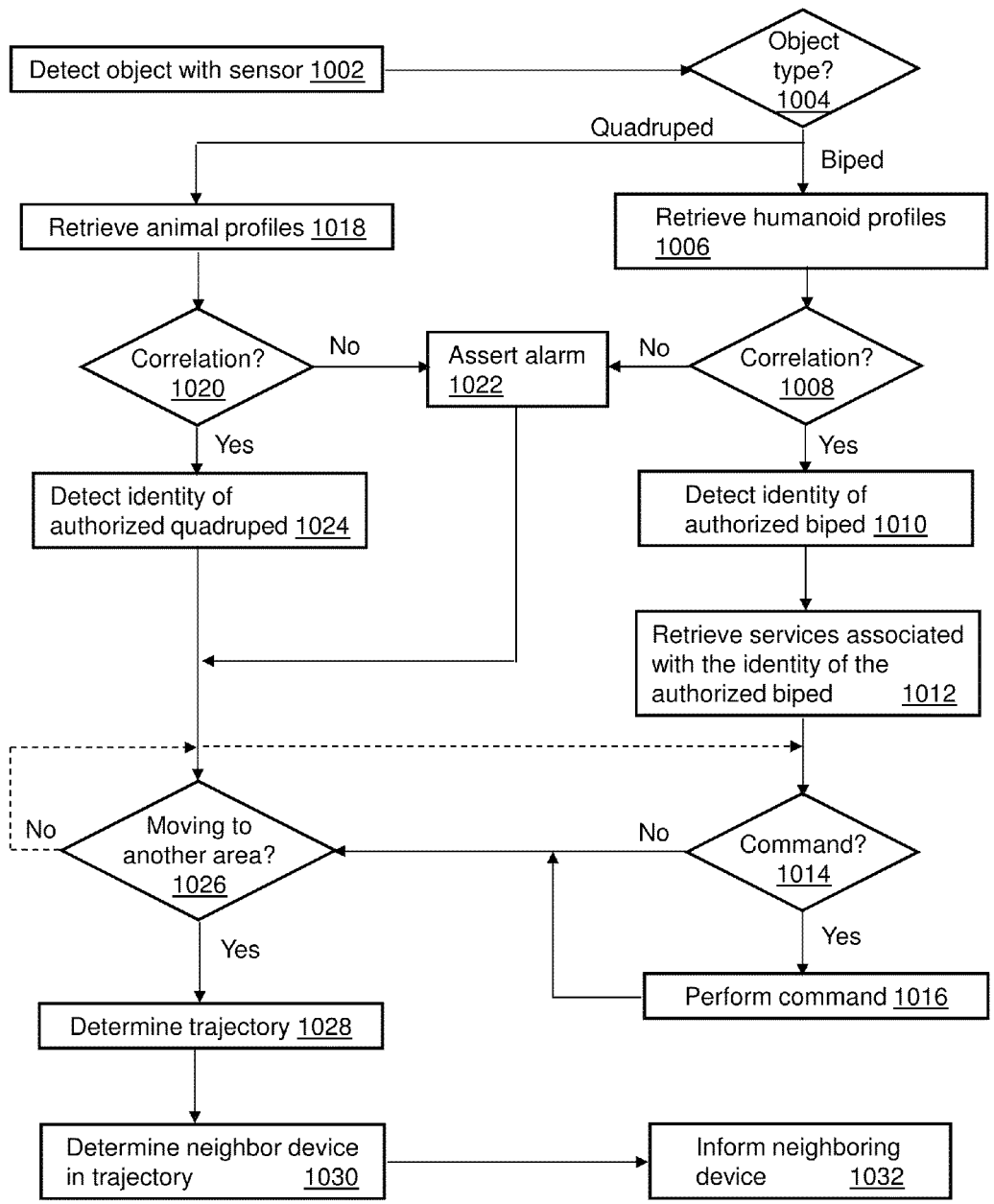
FIG. 10 depicts an illustrative embodiment of a method operating in portions of the systems described in FIGS. 1-8.

FIG. 10 depicts an illustrative embodiment of a method 1000 operating in portions of the systems described in FIGS. 1-8. Method 1000 can begin with step 1002 in which one of the sensors 121 shown in the illustrative layout of FIG. 7 detects an object. The object can be detected by the sensor 121 based on image data and/or infrared data produced by the sensor 121. The object can be a moving or still object of a person or animal which is in a detectable range 802 of the sensor 121 as shown in FIG. 8. At step 1004, the sensor 121 can be programmed to detect an object type from the sensor data. The image portion of the sensor data can, for example, identify member parts of the object (e.g., legs) and determine therefrom that the object is a biped (likely humanoid) or quadruped (likely animal). If the object is a biped, the sensor 121 can proceed to step 1006 where it retrieves humanoid profiles.

The humanoid profiles can be locally stored in the sensor 121 or on the server 131 of FIGS. 1-2. The humanoid profiles can represent profiles of individuals for which biometric signatures have been recorded. As noted earlier, one or more of the sensors 121 can be programmed to capture sensor data of an individual at different perspectives, analyze the sensor data and create a biometric signature of the individual based on different perspectives (front, side, rear, or other suitable angles). Prior to enabling each sensor 121 to monitor the premises, a user can be prompted to perform a setup process where multiple individuals in a household or commercial establishment are asked to position themselves before a sensor 121 in multiple perspectives to capture sensor data and thereby create biometric signatures that can be stored in humanoid profiles Animals under the control of the individual can also be profiled by a sensor 121 based on instructions provided by the sensor 121 to the individual to properly capture sufficient sensor data of the animals to generate biometric signatures for future identifications.

Each humanoid profile can be adapted to include identifying information of the individual such as their name, media services available to the individual (which can be determined from a user account accessible to the server 130 and made available to the sensors 121), gesture commands for controlling media services and/or resources in the premises (e.g., lights, heating, air conditioning, access to a computer, etc.), and other suitable information which can be useful for the sensor 121 to provide adequate monitoring, tracking, and control center services to authorized individuals.

Once the humanoid profiles are retrieved in step 1006, the sensor 121 can compare the biometric signature of each of the profiles to the biped object until it finds the profile that correlates to the biped. Correlation can be determined from an analysis of the member parts of the biped, contours of the biped, and/or facial characteristics of the biped to enable the sensor 131 to detect a probable match to the biometric signature of one of the humanoid profiles. If none of the biometric signatures of the profiles correlate to the biped object, then the sensor 121 can proceed to step 1022 where an alarm is asserted. The alarm may be a silent or audible alarm. The alarm may be a device coupled to the sensor 121, or it may be a device controlled by, for example, the server 131 upon the server 131 receiving a message or signal from the sensor 121 indicating an alarm state.

If the biped correlates to one of the profiles, the sensor 121 can proceed to step 1010 where the sensor 121 identifies the biped. This step can be performed by the sensor 121 retrieving additional information stored in the profile such as the name of the person, his/her authorization to be in the premises, and so on. At step 1012, the sensor 121 can further identify from the profile services associated with the identified person. The services can be, for example, media services available at the premises (e.g., television resources, audio resources, etc.). The services can further include computing and communication resources available at the premises such as, for example, phone services, computer services, and so on. Once the person is identified, the sensor 121 can cause the services to be enabled for the person's use. This step can represent the sensor 121 sending a message to the server 131 identifying the presence of the person, which causes the server 131 to enable such services.

At step 1014, the sensor 121 can monitor commands invoked by the person. Commands can be in the form of speech commands, gesture commands, or combinations thereof. Once a command is detected at step 1014, the sensor 121 can proceed to step 1016 where it performs actions to effectuate the command. The action can be, for example, controlling lighting in the room, setting the temperature of an air conditioning or heating monitor, changing the volume on a television unit, retrieving music files which are presented to a media processor for presentation, and so on. If a command is not detected at step 1014, or the command is completed at step 1016, the sensor 121 proceeds to step 1026 where it determines if the person is moving to another area in the premises.

The sensor 121 can make this determination by detecting a trajectory of the person's movement. The direction taken by a person can be determined by image data and/or infrared data, which enables the sensor 121 to calculate the person's change in location and rate of change. If, for example, the person is moving towards a door or out of the reach of the detectable area of the sensor 121, the sensor 121 can compare the person's trajectory to the layout of other sensors 121 in the premises as shown in FIG. 7. The layout can be provided by the server 131 to each sensor 121. The server 131 can be made aware of the layout of sensors 121 in the premises by an administrator of the premises. The administrator can interface to the server 131 by way of the portal 302 described in FIG. 3. The portal 302 can be configured to allow the administrator to create a layout of the premises with tools provided by the portal 302. Once the layout is complete, the administrator can identify where each sensor 121 is located. The administrator can also identify what each area in the premises represents (family room, office, conference room, etc.). In this manner, when an alarm is triggered at step 1022, the alarm can also identify the affected rooms.

Alternatively, the sensors 121 can be locally controlled at the premises by way of a computing device such as a computer. The computer can include software applications to enable the administrator to layout the premises and identify the location of the sensors 121. In yet another embodiment, the sensors 121 can be configured with location sensors (e.g., GPS or RFID's) to identify their location within the premises. The location of the sensors 121 based on any of the aforementioned embodiments can be conveyed to each sensor 121 from a central device (server 131 or local computer) or between sensors 121 that are self-aware of the respective locations. Each sensor 121 can maintain a database of sensor locations, the layout of the premises, and names of rooms in the premises to assess where the trajectory of a person may lead him or her to.

Once a trajectory is determined at step 1028, the sensor 121 can determine from the layout and the location of the other sensors 121 which neighboring sensor(s) 121 are in the trajectory of the individual. Once this determination is made, the sensor 121 transmits a message to the neighboring sensor(s) 121 at step 1032 to alert the sensor(s) 121 of the person's trajectory. The message can include the identity of the person if known and services enabled for the individual. Steps 1026-1032 can be used to track the person's whereabouts, and to enable other sensors 121 to immediately present the person services previously presented by the sensor 121 conveying the trajectory message. In an embodiment where the alarm at step 1022 is triggered, steps 1026 through 1032 provide a means to track an unidentified person's whereabouts which can be reported by each sensor 121 to the server 131 or other alarm processing device in the premises.

Referring back to step 1004, if the sensor 121 (that detected an object at step 1002) determines that the object is a quadruped, the sensor 121 proceeds to step 1018 where it retrieves animal profiles. The animal profiles can be locally stored or a retrieved from the server 131. At step 1020 the sensor 121 can perform correlation analysis by comparing the sensor data of the quadruped to biometric signatures of the animal profiles. If a match is not detected, the sensor 121 proceeds to step 1022 where the sensor 121 asserts the alarm 1022. The sensor 121 can then proceed to steps 1026 through 1032 to monitor the whereabouts of the unidentified animal. The tracking of the animal can be useful to the administrator of the premises to quickly locate and remove the animal from the premises. If a correlation is detected, the sensor 121 proceeds to step 1024 where it identifies the animal according to information supplied in the matching animal profile. The animal's whereabouts can also be tracked in steps 1026-1032 as described earlier. The whereabouts and identity of the animal can be communicated by each sensor 121 to the server 131 or to a local computer of the administrator.

The aforementioned embodiments of method 100 provide a more accurate and precise method for identifying objects, which can substantially reduce false alarms. The above embodiments also provide an administrator of the premises a resource for tracking the whereabouts of objects whether authorized or unauthorized, enabling the administrator to better manage the use of the premises by others.

Upon reviewing the aforementioned embodiments, it would be evident to an artisan with ordinary skill in the art that said embodiments can be modified, reduced, or enhanced without departing from the scope and spirit of the claims described below. For example, method 1000 can be adapted so that a sensor 121 audibly queries a biped in the event that a profile match is not found due to the biped's member parts and/or contours not matching a corresponding biometric signature. The query can cause the biped to respond verbally. The verbal response can be compared by a sensor 121 to an audible biometric signature of the profiles. If after such comparisons, a profile match is not found, then the sensor 121 can proceed to trigger an alarm at step 1022 as previously described. However, if a match is found, a false alarm can be avoided. In another embodiment, method 1000 can be adapted so that a sensor 121 is programmed to audibly request a gesture command from the biped to identify the biped. The gesture performed by the biped (e.g., hand motions, finger motions, leg or arm motions) can be compared to recorded gestures to identify the person as authorized to be in the premises. This embodiment can also avoid false alarms.

In yet another embodiment, method 1000 can be adapted to submit a signal to an approved object, such as a humanoid, to indicate to the detected person that they have been approved or unapproved. The signal can be audible, visual (e.g., turning on a green LED on the sensor 121), or both. In one embodiment, method 1000 can be adapted to cause the sensor 121 to capture images of an unauthorized object, time stamp its activities, and track its movements. The images may be still or moving images such as video. The captured images can be submitted to the administrator of the building from which the sensors 121 operate and/or other entities such as the police. In addition, the sensors 121 can be adapted to submit streaming video or a sequence of still images to a communication device (e.g., mobile device, computer) of the administrator or other authorities to enable the recipient to observe the unauthorized object.

In yet another embodiment, method 1000 can be adapted so that the sensors 121 or server 131 receive user input or speech commands generated from the communication device of the administrator and/or other authorities to disengage an alarm upon recognizing the unauthorized object. In one embodiment, the administrator and/or other authorities can submit user input or speech commands from the communication device to generate a request received and processed by the sensors 121 or the server 131 for establishing an audio feed to the sensors 121 to enable the requesting party to engage in audio communication with the unauthorized object by way of a microphone and speaker interface of the sensor 121 nearest the unauthorized object.

The sensors 121 can also be adapted to transmit messages to a communication device of the administrator indicating the whereabouts of identified or unidentified objects. The communication device may be a cellular phone, a computer, or the web portal 302 described earlier. In one embodiment, the sensors 121 can maintain local logs of objects detected, their trajectories, their ingress and egress times, and so on. This information can be communicated to the server 131 or a local computer, which can map the movements of persons and/or animals. Such mappings can be presented in a graphical user interface showing the layout of the premises, and the travel paths of detected individuals or animals. The graphical user interface can be transmitted to a mobile device of the administrator, or can be presented by way of the portal 302.

Other embodiments are contemplated by the subject disclosure.

Figure 11:
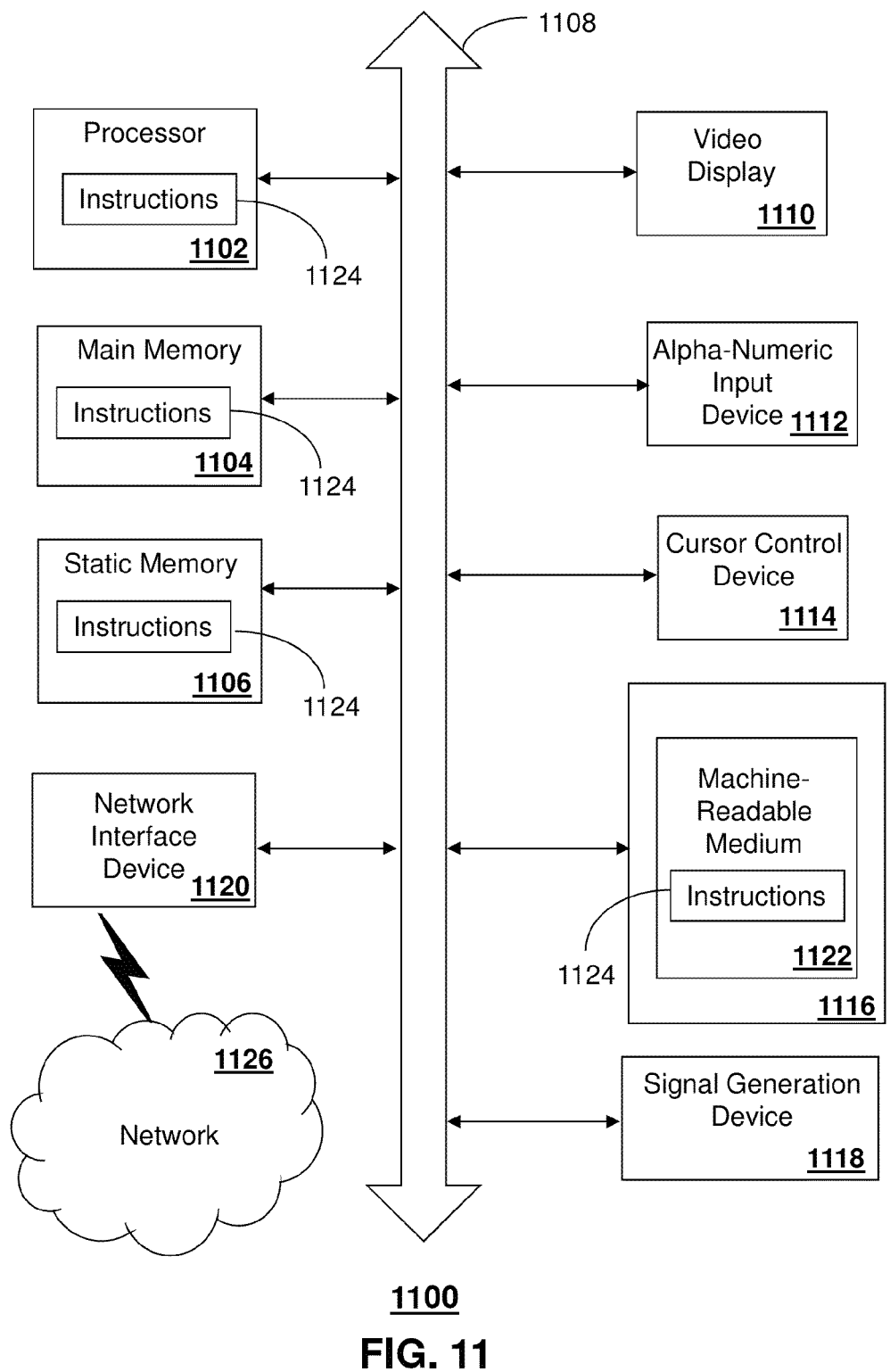
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods discussed above. One or more instances of the machine can operate, for example, as the server 130, media processor 106, the media devices 108, the wireless communication devices 116, the CDs 201, 202, 203 or 205, and/or other devices of FIGS. 1-6. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, or a solid state display. The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A device, comprising:
a sensor;
a memory storing executable instructions; and
a processor coupled to the memory, wherein the processor responsive to executing the instructions performs operations comprising:
receiving sensor data from the sensor;
detecting an object according to the sensor data;

asserting an alarm responsive to determining from the sensor data that the detected object is not correlated to any of a plurality of profiles biometrically descriptive of approved objects;
classifying the detected object as an authorized object responsive to determining from the sensor data that the detected object is correlated to a profile of the plurality of profiles;
responsive to determining that the detected object is an authorized person:
identifying, from the profile, services associated with the person and commands for controlling the respective services,
enabling the services for use by equipment of the person, and
monitoring commands invoked by the equipment of the person; and
notifying a neighboring device responsive to asserting the alarm or responsive to classifying the detected object as the authorized object,
wherein the plurality of profiles comprises a biometric signature of a person including an audible signature of the person or a recorded gesture of the person, and
wherein the biometric signature further includes a dimension of a body part of the person.

2. The device of claim 1, wherein the sensor comprises an imaging sensor, a depth sensor, or both.

3. The device of claim 1, wherein the dimension comprises an arm length, a leg length, a shoulder width, a hip width, or a combination thereof, and wherein the operations further comprise identifying member parts of the detected object according to the sensor data.

4. The device of claim 3, wherein the operations further comprise:
selecting from the plurality of profiles a humanoid profile responsive to determining from the member parts that the detected object is a biped organism; and
detecting from a comparison of the sensor data and the selected humanoid profile that the biped organism is an approved object or is a disapproved object.

5. The device of claim 4, wherein the operations further comprise detecting that the biped organism is an approved object according to a biometric analysis of body contours of the biped organism using the sensor data.

6. The device of claim 4, wherein the operations further comprise detecting that the biped organism is an approved object according to a biometric analysis of facial characteristics of the biped organism using the sensor data.

7. The device of claim 4, wherein the operations further comprise detecting that the biped organism is one of the approved objects according to a gesture movement of at least one of the member parts.

8. The device of claim 1, wherein the authorized object is a human being or animal authorized to be in an area where the device is located.

9. The device of claim 1, wherein the operations further comprise:
determining that the detected object is moving in a trajectory of the neighboring device; and
notifying the neighboring device of the trajectory of the detected object.

10. The device of claim 3, wherein the operations further comprise:
selecting from the plurality of profiles an animal profile responsive to determining from the member parts that the detected object is a quadruped organism; and
detecting from a comparison of the sensor data and the selected animal profile that the quadruped organism is an approved object or is a disapproved object.

11. The device of claim 1, wherein the operations further comprise receiving a notification from the neighboring device prior to detecting a presence of the object that the object is moving in a trajectory detectable by the sensor.

12. The device of claim 1, wherein the memory comprises a database of locations of a plurality of neighboring devices, wherein the plurality of neighboring devices includes the neighboring device, and wherein the neighboring device utilizes the database to notify another device of the plurality of neighboring devices when the detected object is moving in a trajectory towards the other device of the plurality of neighboring devices.

13. A method, comprising:
detecting, by a system including a processor, a presence of an object from sensor data generated by a sensor device;
retrieving, by the system, from a memory device a plurality of profiles biometrically descriptive of approved objects;
asserting, by the system, an alarm responsive to determining from the sensor data that the object is not biometrically correlated to any of the plurality of profiles;
classifying, by the system, the object as an approved object responsive to determining from the sensor data that the object is biometrically correlated to a profile of the plurality of profiles;
responsive to determining that the detected object is an approved person:
identifying, by the system and from the profile, services associated with the person and commands for controlling the respective services,
enabling, by the system, the services for use by equipment of the person, and
monitoring, by the system, commands invoked by the equipment of the person; and
notifying, by the system, a neighboring device responsive to asserting the alarm or responsive to classifying the object as an approved object,
wherein the plurality of profiles comprises a biometric signature of a person including an audible signature of the person or a recorded gesture of the person, and
wherein the biometric signature further includes a dimension of a body part of the person.

14. The method of claim 13, comprising:
detecting, by the system, from the sensor data member parts of the object;
selecting, by the system, from the plurality of profiles a humanoid profile responsive to determining from the member parts that the object is a biped organism; and
detecting, by the system, from a comparison of the sensor data and the selected humanoid profile that the biped organism is an approved object or is a disapproved object.

15. The method of claim 14, comprising, by the system, detecting that the biped organism is an approved object according to a biometric analysis of body contours of the biped organism, a biometric analysis of facial characteristics, a gesture movement of one of the member parts, or a combination thereof.

16. The method of claim 13, comprising:
detecting, by the system, member parts of the object from the sensor data;
selecting, by the system, from the plurality of profiles an animal profile responsive to determining from the member parts that the object is a quadruped organism; and detecting, by the system, from a comparison of the sensor data and the selected animal profile that the quadruped organism is an approved object or is a disapproved object.

17. A machine-readable storage medium, comprising executable instructions, wherein responsive to a processor executing the instructions, the processor performs operations, comprising:

detecting an object from sensor data generated by a sensor device;

retrieving a plurality of profiles biometrically descriptive of authorized objects;

classifying the detected object as an authorized object responsive to determining from the sensor data that the detected object is biometrically correlated to a profile of the plurality of profiles;

responsive to determining that the detected object is an authorized person:

identifying, from the profile, services associated with the person and commands for controlling the respective services, enabling the services for use by equipment of the person, and monitoring commands invoked by the equipment of the person; and notifying a neighboring device responsive to classifying the detected object as an authorized object, wherein the plurality of profiles comprises a biometric signature of a person including an audible signature of the person or a recorded gesture of the person, and wherein the biometric signature further includes a dimension of a body part of the person.

18. The machine-readable storage medium of claim 17, wherein the services comprise media services associated with a premises, resources associated with the premises, or a combination thereof.

19. The machine-readable storage medium of claim 17, wherein the operations further comprise:

receiving from a remote server data associated with service entitlements; and caching the data to enable facilitation of establishment of services for subsequent detections of the authorized object.

20. The machine-readable storage medium of claim 17, wherein the operations further comprise creating the profile biometrically correlated to the authorized object from other sensor data used to biometrically identify the authorized object.

* * * * *

UNITED STATES PATENT AND TRADEMARK OFFICE
CERTIFICATE OF CORRECTION

PATENT NO. : 9,293,016 B2
APPLICATION NO. : 13/454729
DATED : March 22, 2016
INVENTOR(S) : Lee Friedman Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this
Twenty-third Day of August, 2016

Michelle K. Lee
*Director of the United States Patent and Trademark Office*